United States Patent
Naidu et al.

(10) Patent No.: US 11,436,068 B2
(45) Date of Patent: Sep. 6, 2022

(54) APPLICATION PROGRAMMING INTERFACE ANOMALY DETECTION

(71) Applicant: VISA INTERNATIONAL SERVICE ASSOCIATION, San Francisco, CA (US)

(72) Inventors: Nagraj K. Naidu, Foster City, CA (US); Sheeban Raza Zaheer Shaikh, Foster City, CA (US); Christopher Patrick, Foster City, CA (US); Santanu Bhattacharya, Foster City, CA (US)

(73) Assignee: VISA INTERNATIONAL SERVICE ASSOCIATION, Foster City, CA (US)

( * ) Notice: Subject to any disclaimer, the term of this patent is extended or adjusted under 35 U.S.C. 154(b) by 365 days.

(21) Appl. No.: 16/589,990

(22) Filed: Oct. 1, 2019

(65) Prior Publication Data

US 2021/0096937 A1     Apr. 1, 2021

(51) Int. Cl.
*G06F 9/54* (2006.01)
*G06Q 20/20* (2012.01)
*G06Q 20/10* (2012.01)

(52) U.S. Cl.
CPC ............. *G06F 9/547* (2013.01); *G06Q 20/10* (2013.01); *G06Q 20/20* (2013.01); *G06Q 20/202* (2013.01)

(58) Field of Classification Search
CPC ...... G06Q 20/202; G06Q 20/20; G06Q 20/10; G06F 9/547
See application file for complete search history.

(56) References Cited

U.S. PATENT DOCUMENTS

| | | | |
|---|---|---|---|
| 9,826,349 B1* | 11/2017 | Yang | H04W 64/00 |
| 10,045,218 B1* | 8/2018 | Stapleton | G06N 7/005 |
| 10,346,744 B2* | 7/2019 | Dodson | G06N 20/00 |
| 10,678,925 B2* | 6/2020 | Bruso | G06F 21/554 |
| 10,902,062 B1* | 1/2021 | Guha | G06N 5/003 |
| 11,005,839 B1* | 5/2021 | Shahidzadeh | H04L 63/0876 |
| 2016/0048552 A1* | 2/2016 | Graham | G06F 16/215 |
| | | | 707/690 |
| 2019/0251457 A1* | 8/2019 | Byrnes | G06F 16/24568 |
| 2019/0371133 A1* | 12/2019 | Korolev | G06Q 30/0201 |

\* cited by examiner

*Primary Examiner* — Florian M Zeender
*Assistant Examiner* — Christopher R Buchanan
(74) *Attorney, Agent, or Firm* — Loeb & Loeb LLP

(57) ABSTRACT

A central server receives API calls requesting services. The central server identifies whether the API calls are associated with a merchant. A distribution is constructed based on the API calls. The central server further executes a pre-defined rule to identify a set of the API calls belonging to a maximum percentile in the distribution and a set of the API calls belonging to a minimum percentile in the distribution before estimating a set of the anomalous data points with one or more goodness of fit functions against the maximum percentile and the minimum percentile. A GUI receives a critical value from a user. In response to receiving the critical value, the central server generates probabilities of the set of the anomalous data points before displaying a set of the anomalous data points in response to the probabilities being less than the critical value.

20 Claims, 16 Drawing Sheets

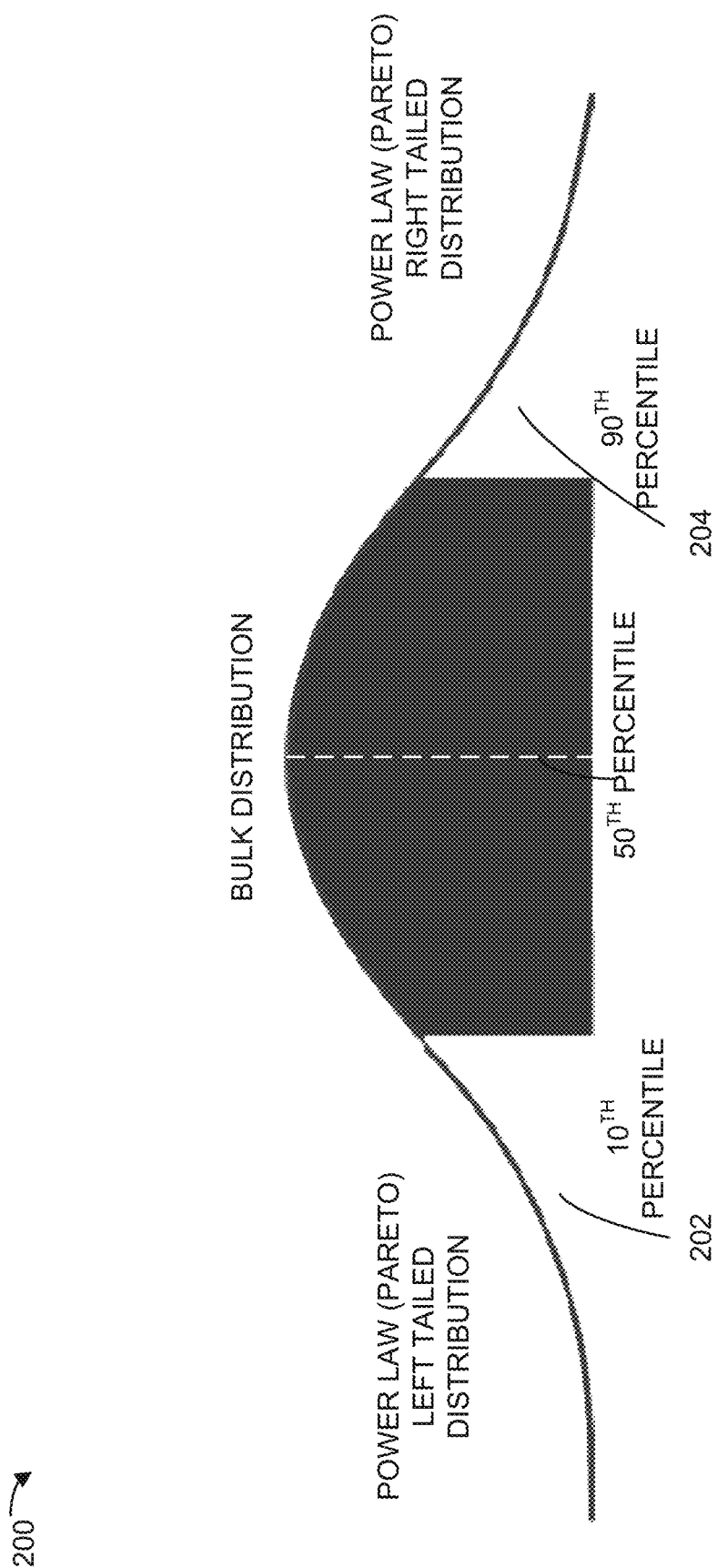

FIG. 3A
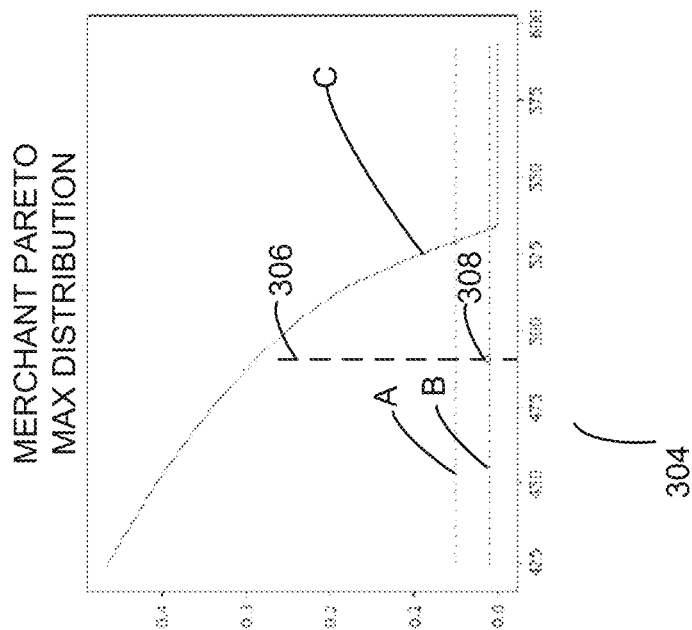
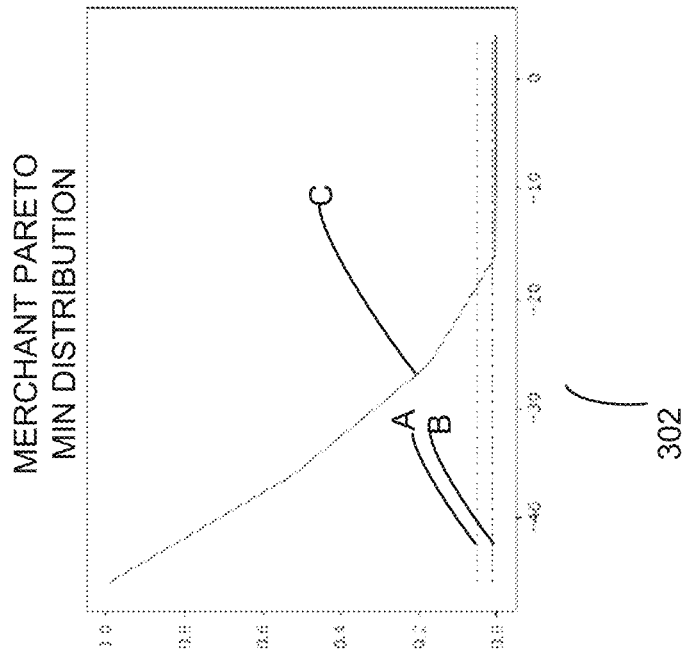

FIG. 5B

API ANOMALY DETECTION NOTIFICATION CONFIG

MERCHANT ID: 205908295080 — 522

NOTIFICATION METHOD — 524

☑ EMAIL    ☑ CELL — 526

CURRENT DISTRIBUTION MODEL — 528

○ PARETO EXTREME MODEL
○ GUMBEL MODEL
☑ QUANTILE MODEL
— 530

RECOMMENDATION — 532

○ PARETO EXTREME MODEL
☑ GUMBEL MODEL
○ QUANTILE MODEL
— 534

ACCEPT 536    SUBMIT 538    CANCEL 540

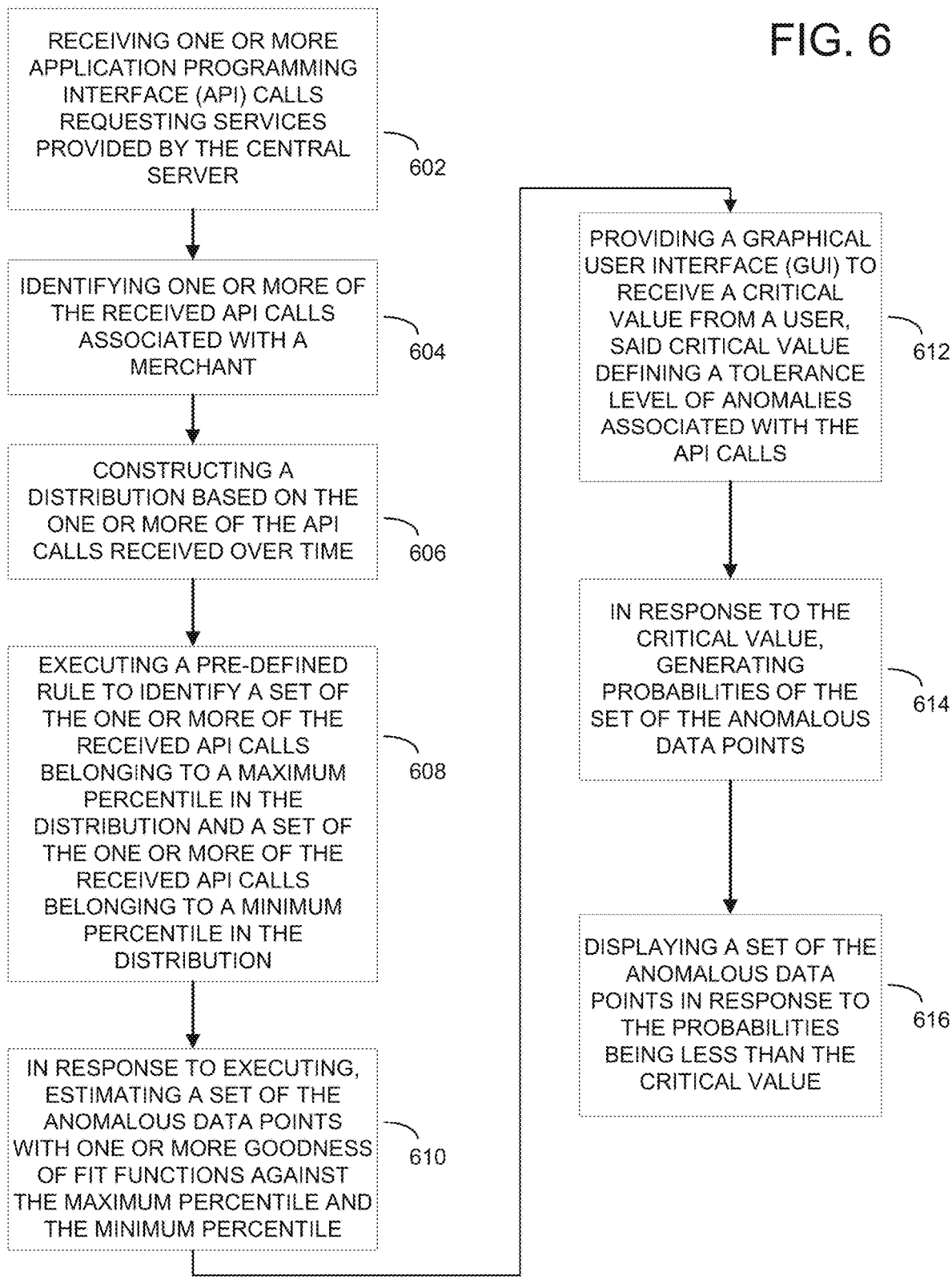

APPLICATION PROGRAMMING INTERFACE ANOMALY DETECTION

TECHNICAL FIELD

Embodiments discussed herein generally relate to detecting application programming interface (API) anomalies.

BACKGROUND

Payment processing network and devices associated with the network process millions, if not billions, of transactions in any given moment. These transactions come from various sources, such as physical bricks and mortar stores, online stores, domestic merchants, and international merchants. These merchants' devices, such as point-of-sale (POS) devices, an application (e.g., app) to be installed on a mobile device of a consumer, etc., may communicate with the payment processing network's servers via a number of ways, such as application programming interfaces (APIs). These API calls promote efficiencies and reduce human errors.

However, even with well-defined API specifications and API call instructions, errors are to be expected. In one example, these errors may be caused by wrong inputs or unrecognized parameters included in the API calls. In another example, the errors may be due to transmission issues where parts of data packets were lost due to connection issues, routing issues, etc. However, current approaches tend to produce large amount of false positives and may over-alert system administrators or account managers. For example, a drop of 5% in API calls or responses might be a threshold that is unacceptable for an online shopping platform, but not all situation of such a 5% drop should be alerted to the online shopping platform because of different context. For instance, a drop of 5% of API calls—a perceived anomaly—in a given non-holiday shopping week might be alarming, which may indicate connection failure or other failure in the platform. The same 5% drop after a huge holiday sale deadline may be anticipated or expected, hence, it is not an anomaly.

As such, the payment processing network needs a better way to detect issues and identify anomalies to better assess the various kinds of error types.

Therefore, embodiments attempt to create a technical solution to address the deficiencies of the challenges above.

SUMMARY

Embodiments create a technical solution to the above challenges by better detecting anomalies in API calls. Aspects of embodiments monitor the various API calls from merchants and build a distribution based on the calls. After the distribution is constructed, embodiments may identify various segments of the distribution to further analyze anomalies before alerting a system administrator or a merchant account manager. Overtime, based on the detected anomalies, embodiments may recommend adjusting the distribution so that the detection is more accurate for any given merchant.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

FIGS. 2A-2B are diagrams illustrating a probability distribution for identifying or detecting anomalies in API calls according to one embodiment.

FIGS. 3A-3B are distribution charts showing fitness tests according to one embodiment.

FIG. 5B illustrates a notification configuration GUI for recommending a more suitable probability distribution according to one embodiment.

FIG. 6 is a flow chart illustrating a method according to one embodiment.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Embodiments may create a system for recommending an analysis model with corresponding conditions and parameters that may assist monitoring of transactions of a given merchant so that the system may detect anomalies in the data. Aspects of embodiments may enable the system then alert a user about the anomalies. At the same time, based on the analysis of transaction data overtime, the system may provide recommendation and suggestion to the user with a different model so as to avoid false positives.

Figure 1:
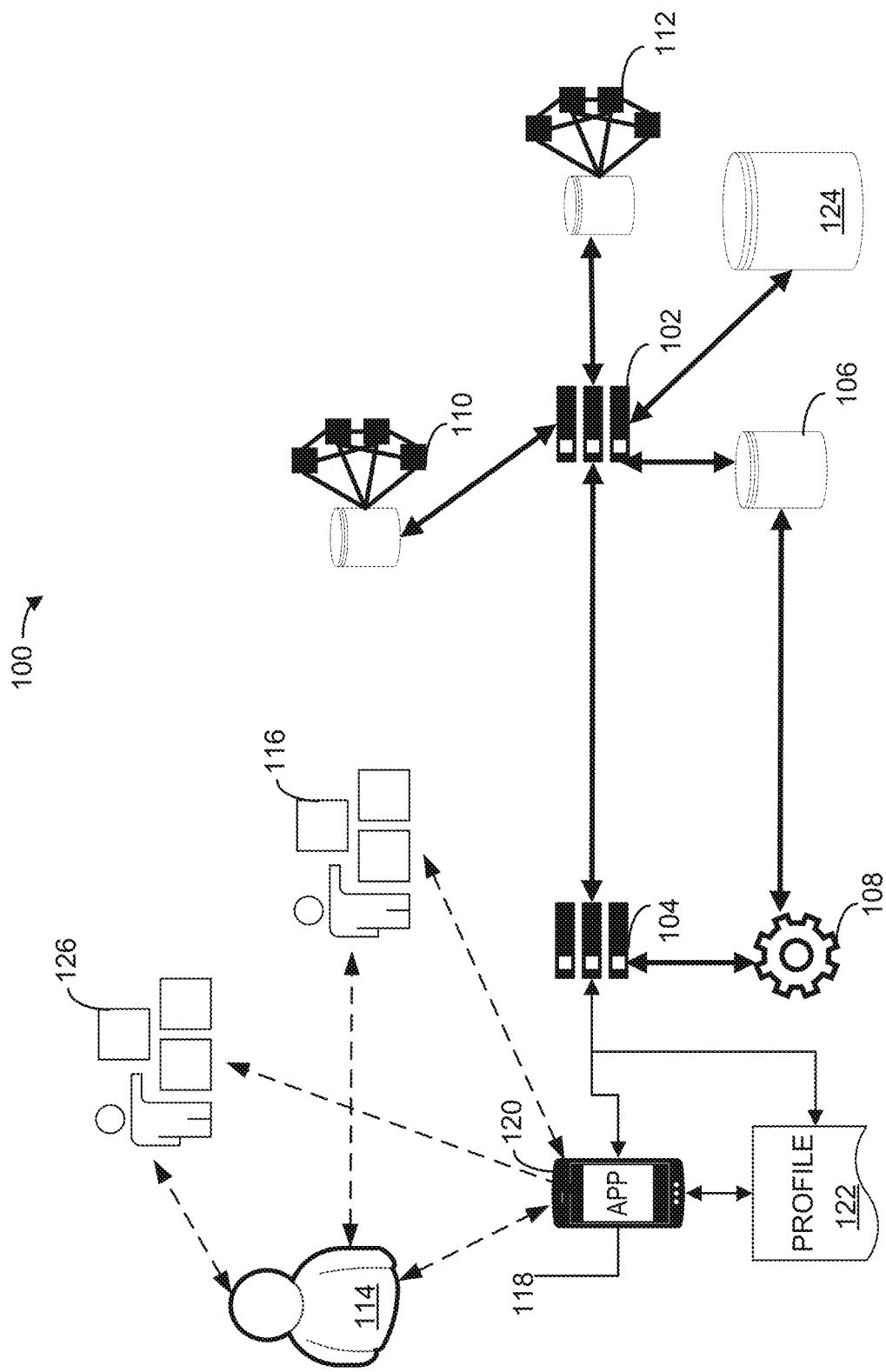
FIG. 1 is a diagram illustrating a system for detecting application programming interface anomalies according to one embodiment.

Referring now to FIG. 1, a diagram may illustrate a system 100 as a high level system implementation according to one embodiment. The system 100 may include a server 102 that process transactions in a payment processing network. In one embodiment, the server 102 may be a cluster of servers that spread across geographic regions as transactions are submitted around the world. Transactions may include transaction data coming from an acquirer 110 (e.g., when a consumer makes a purchase at a merchant) and, after processing and verification, to and return from an issuer 112 of the consumer's payment device. As such, the server 102 may handle encryption, decryption, and authentication, etc., (e.g., via a token or a hash) of the transaction data to complete a given transaction. In another embodiment, the server 102 may include or may be coupled to a front end server 104 and a data store 106 for storing transaction data. For example, the front end server 104 may provide graphical user interface (GUI) to portals to service consumers and merchants. In another embodiment, the front server 104 may provide web services to service client applications or apps. In one embodiment, the front end server 104 and the server 102 may host a digital wallet service that enable a consumer to manage and pay for goods and services using the user's payment devices, such as a credit card or a debit card.

In another embodiment, the system 100 may include a configuration portal 108 for administrator privileged users to configure, management, and administer the server 102, the front end server 104, and the data store 106. In a further embodiment, the data store 106 may store temporary transaction data or historical data for analysis. In this aspect, the historical data may be a copy of the actual transaction data and the copy has been anonymized such that personal identifying data has been removed, unless explicit and specific authorization has been given by the user.

In a further embodiment, a user 114 may initiate a transaction (e.g., payment for goods or services) at a merchant 116 or may initiate a transaction via a mobile device 118 of the user 114. The mobile device 118, having an app or a browser 120 (hereinafter "app" for simplicity and not as a limitation), may navigate the user 114 to a portal hosted or sponsored by the merchant 116 so that the user 114 may complete the transaction.

In an aspect, the system 100 may also host a library 124 of application programming interfaces (APIs) that the merchant 116, the acquirer 110, or the issuer 112 may call to request services from the system 100 as a whole or from the server 102. In one example, the system 100 may provide details of any given API so that the merchant 116, the acquirer 110, or the issuer 112 may issue API function calls to the server 102 to take advantages of the network infrastructure and capability of the system 100.

Overtime, the system 100 may also provide analytic tools or administrative tools to assist the merchant 116, the acquirer 110, or the issuer 112 in diagnosing, detecting, and troubleshooting transactions initiated or processed from the merchant 116, the acquirer 110, or the issuer 112. For example, the merchant 116 may have a different pattern of transactions from that of a merchant 126 due to various factors, such as (1) merchandize categories; (2) merchant category; (3) pricing of merchandizes; (4) location; (5) number of items in stock, etc. As such, purchasing patterns and distributions of the merchant 116 may differ from that of the merchant 126.

In another example, the merchant 126 may be an online platform or marketplace that hosts one or more vendors selling products online. As such, the volume of transactions and API calls may look drastically different from other one-vendor merchant.

As such, in an attempt to assist various users of the system 100, aspects of embodiments provide various models to detect anomalies in the process of using the system 100, such as anomalies dealing with API calls or requests.

Referring now to FIG. 2A, a diagram illustrates a probability distribution 200 for identifying or detecting anomalies in API calls. In one embodiment, the distribution 200 may represent a power law Pareto distribution, which may model a long tail (e.g., data points that are far into the tail of the distribution). As shown in FIG. 2, these tails are represented in the 10th percentile 202 and in the 90th percentile 204. These two tails of the distribution 200 are important for further analysis because they represent failures in both tails of the distribution.

For example, a function of the generalized Pareto distribution may be defined as:

$$\overline{F}(x) = Pr(X > x) = \begin{cases} \left(\frac{x_m}{x}\right)^\alpha & x \geq x_m, \\ 1 & x < x_m, \end{cases}$$

Where support is [m, +∞) or (−∞, m].

Figure 2B:
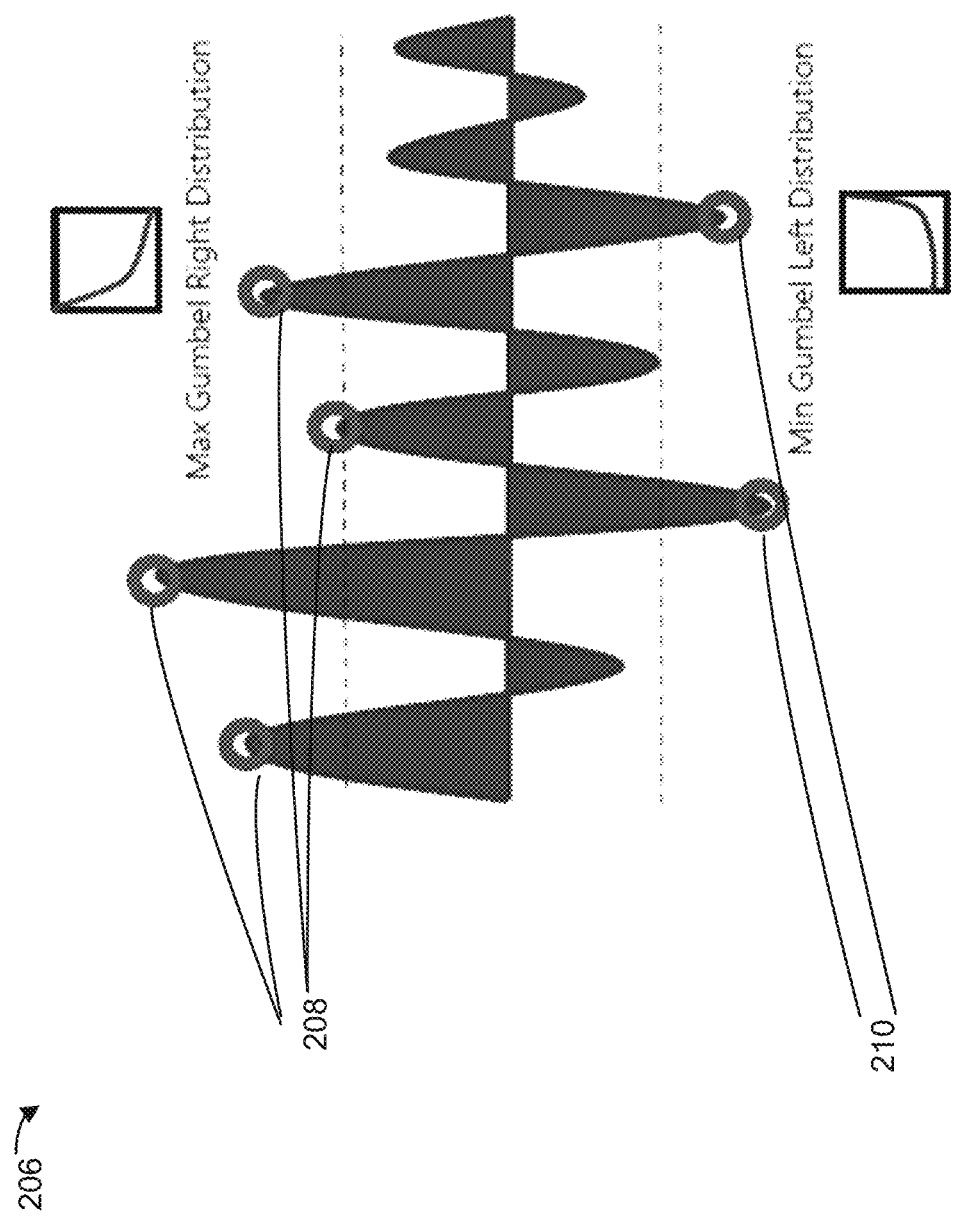

In another embodiment, FIG. 2B may illustrate another model to detect anomalies. For example, a distribution 206 may be a Gumbel distribution that is used to model the distribution of the maximum (or the minimum) of a number of samples of various distributions. In one example, the distribution 206 may be used to represent a distribution of a maximum 208 or minimum 210 level of a merchant in a particular time frame, such as:

By hour;
By day/week;
By week;
By month;
By quarter; and
By any additional user preferences based on volume thresholds, such as by specific holidays or special events. For example, the special days that may see increases in transactions for a given merchant may be federal holidays (e.g., Thanksgiving, Christmas, Memorial Day weekend), traditional or international holidays (e.g., Halloween, the Chinese New Year), or other merchant specific sale days.

With such distribution, the system 100 may be able to detect anomalies in the time intervals identified.

In one embodiment, a minimum Gumbel distribution may be defined by:

$$\frac{1}{\beta} e^{\frac{x-\mu}{\beta}} e^{-e^{\frac{x-\mu}{\beta}}}$$

And a maximum Gumbel distribution may be defined as:

$$\frac{1}{\beta} e^{-\frac{x-\mu}{\beta}} e^{-e^{-\frac{x-\mu}{\beta}}}$$

Where mode is μ, while the median is μ−β ln(ln 2), and the mean is given by $$E(X)=\mu+\gamma\beta,$$

where γ≈0.5772 is the Euler-Mascheroni constant.

The standard deviation σ is βπ/6 hence β=σ6/π≈0.78 σ.

At the mode, where x=μ, the value of F (x; μ, β) becomes e−1≈0.37 whatever the value of β.

In one embodiment, the support is the set of real numbers (−∞, +∞).

In one example, in order to further detecting anomalies, aspects of embodiments may apply one or more steps based on the distribution in FIGS. 2A-2B.

Figure 2C:
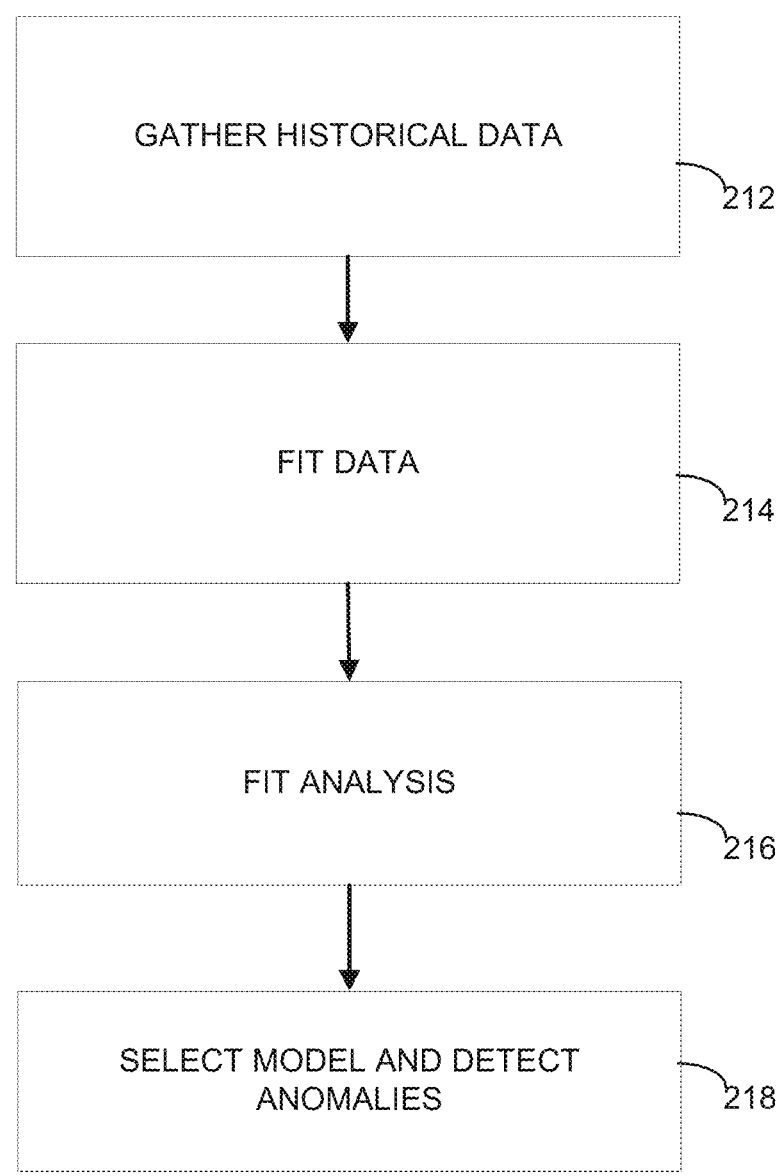
FIG. 2C is a flow chart illustrating a method for detecting API anomalies based on the distributions in FIGS. 2A-2B according to one embodiment.

For example, referring now to FIG. 2C, the system 100 may first gather historical data at 212. In one embodiment, the system 100 may gather historical transaction data for a particular customer (e.g., merchant 116, 126, acquirer 110, or issuer 112). In such an embodiment, the historical data may be organized or collected in univariate time series such that the historical data may be collected:

With such a time series, aspects of embodiments may detect or identify anomalies based on the above time intervals.

In another embodiment, the system 100 may also collect sufficient data or sample so as to produce a more representative distribution or reasonable goodness of the data.

Once the data is collected, the system 100 may fit the collected data in 214. For example, the collected data may be divided into testing and training sets. In another example, aspects of embodiments may pick the 90th or the 10th percentile to gather samples for the "tails" or "ends" of the distribution in FIG. 2A. It is to be understood that other thresholds may be used to narrow the scope of data or sample from the distribution.

Once, the selected, the samples may be fitted to the distribution in FIG. 2A and reports or charts may be generated by the system 100 for further analysis.

Once the report or chart is created, the system 100 may analyze it in 216. For example, the system 100 may first use a goodness of fit to estimate the data, such as KS Test, or Anderson Darling Testing for Samples. At 218, the system 100 may then select the model that best suits the data for the merchant so that the best model may be selected. In one embodiment, the system 100 may provide a graphical user interface (GUI) portal to make the selection. In another embodiment, the system 100 may provide the preferred model to the merchant as a suggestion dynamically or automatically.

Figure 3B:
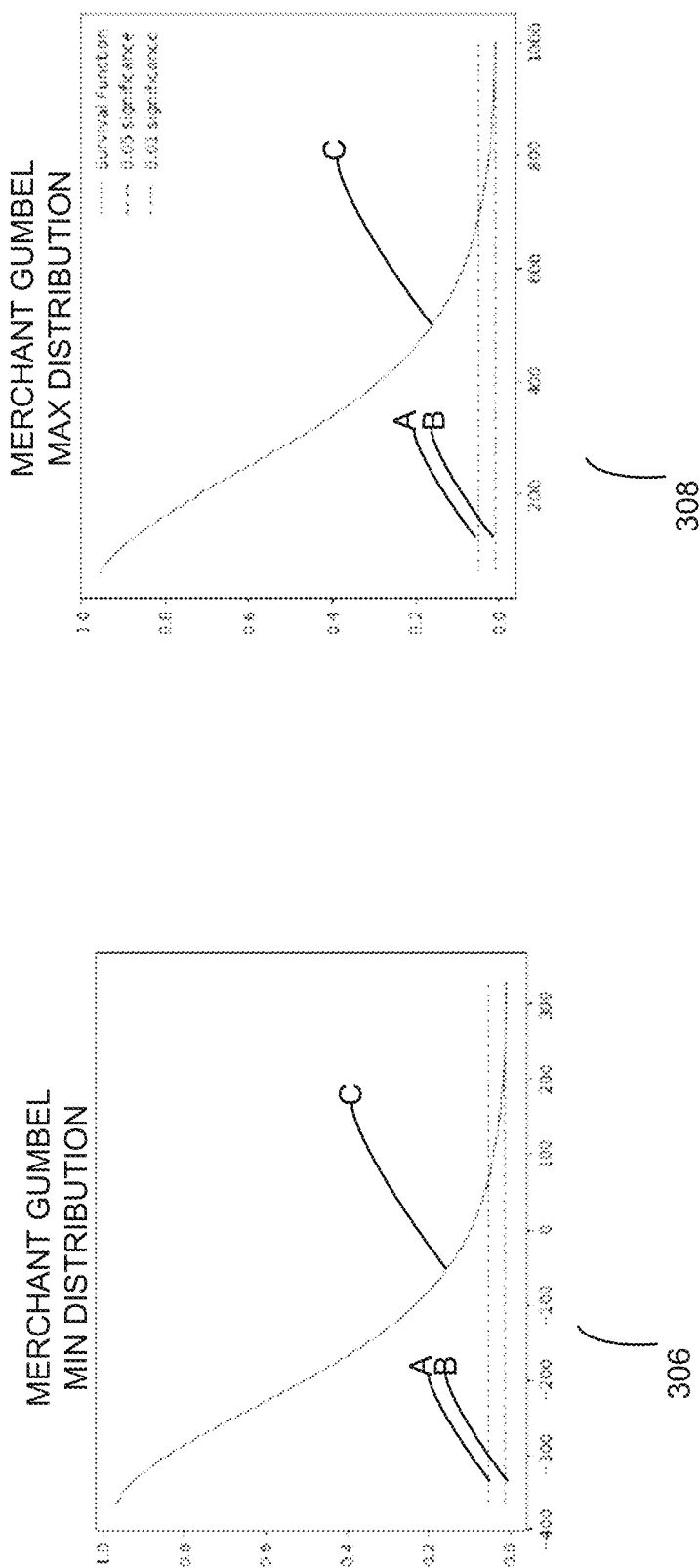

Referring now to FIGS. 3A to 3B, a set of graphs or charts illustrating two examples of distribution models fitness functions. In particular, the charts illustrate a comparison among applying a fitness analysis (e.g., a survival function, an Anderson Darling, and a K-S test) to the Pareto and Gumbel distributions illustrated in FIGS. 2A and 2B. The charts in FIGS. 3A and 3B, for example, include in Y-axis as the probability or significance while the X-axis as the number of days.

In FIGS. 3A and 3B, line C may represent a line based on a survival function, line A may represent 0.01 significance, and line B may represent 0.05 significance. In addition, the data set for the distributions may represent how many transactions in any given number of days. In particular, to identify the various percentage levels, the following set of values are used to build the distribution in Table 1 below:

| Day of week | Percentile (%) |
|---|---|
| 22 | 5 |
| 99 | 25 |
| 261 | 50 |
| 373 | 75 |
| 452 | 95 |
| 490 | 99 |

In FIG. 3A, a chart illustrating Pareto minimum distribution 302 and a chart illustrating Pareto maximum distribution 304 are shown after the application of the Anderson Darling and K-S goodness fitting test. After the application, it is shown in the chart 302 that the Anderson Darling and K-S are good fit for the distribution built based on the data set above, while the same set of tests are not good fit for the chart 304 (e.g., at 1%, the number of transactions should be at 490, as indicated by line 306 and an intersection point 308).

On the other hand, as shown in FIG. 3B where the same Anderson Darling and K-S tests are applied to the Gumbel distribution, both charts 306 and 308 demonstrate a good fit of the distribution.

As such, based on the analysis of the data, the system 100 may determine that the Gumbel distribution may be better suited for this particular merchant, whether it is the merchant 116 or the merchant 126.

Figure 4A:
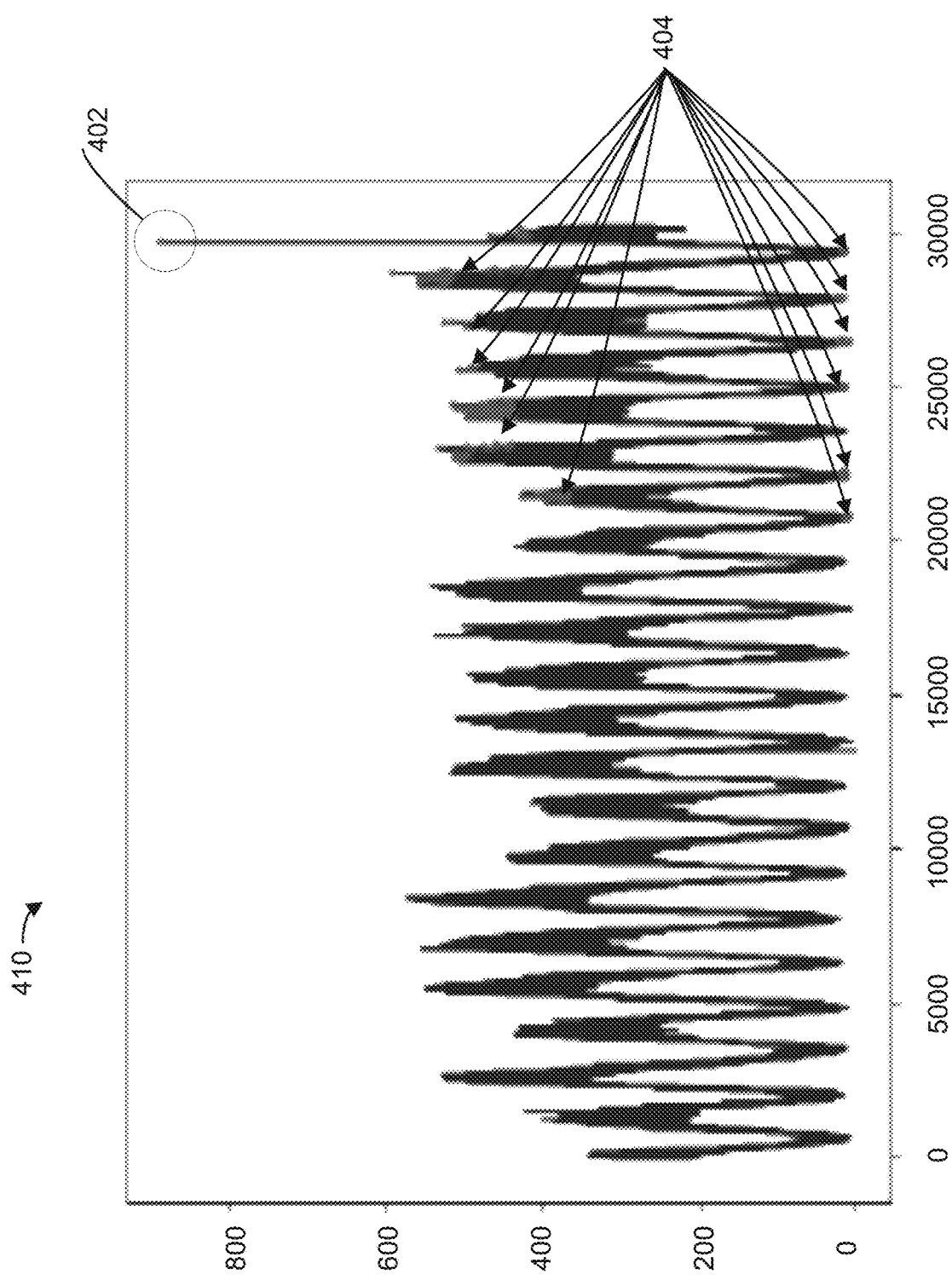
FIGS. 4A-4E are distribution charts showing detection of anomalies based on distribution models and fitness tests according to one embodiment.
Figure 4B:
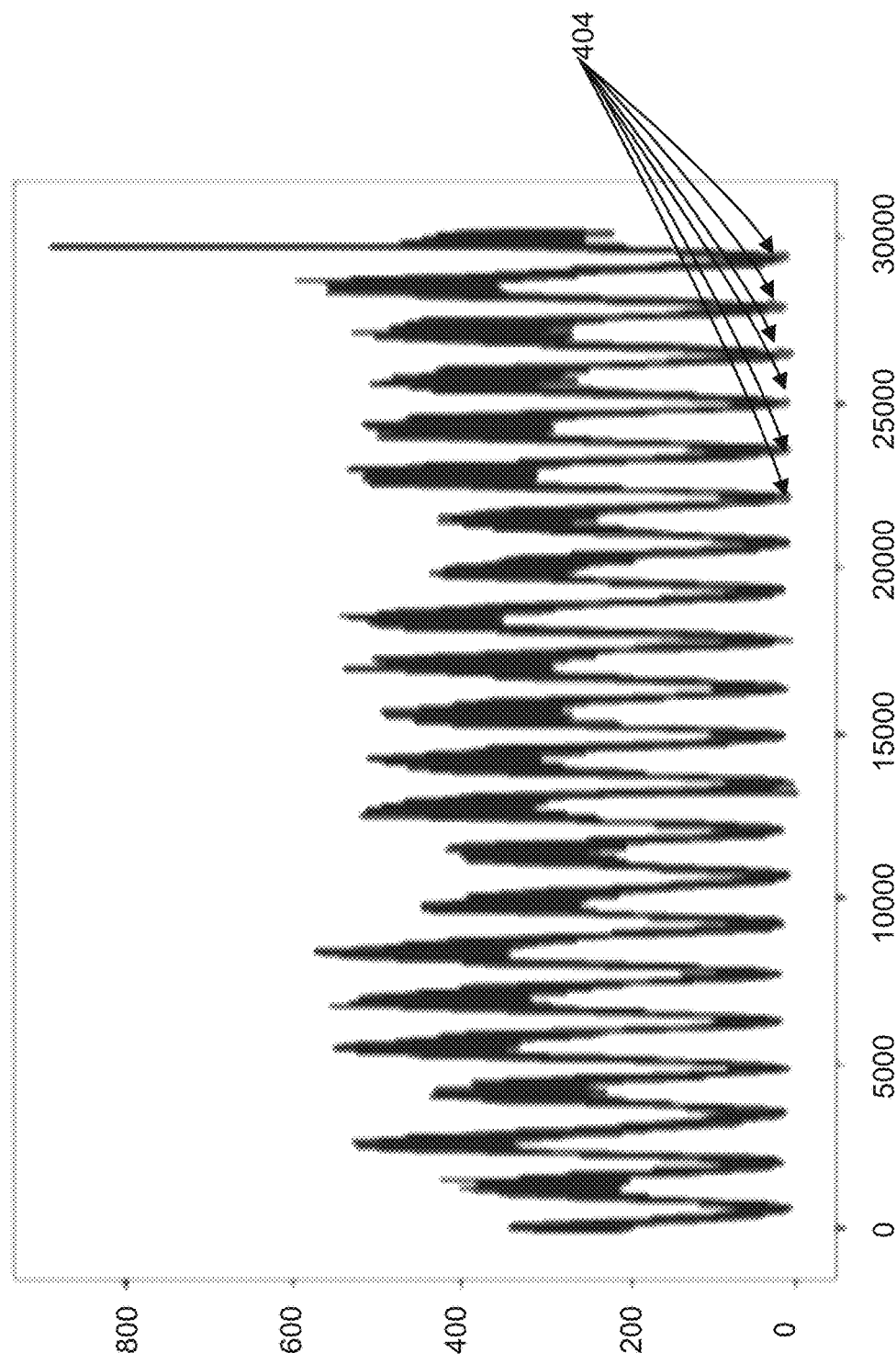
Figure 4C:
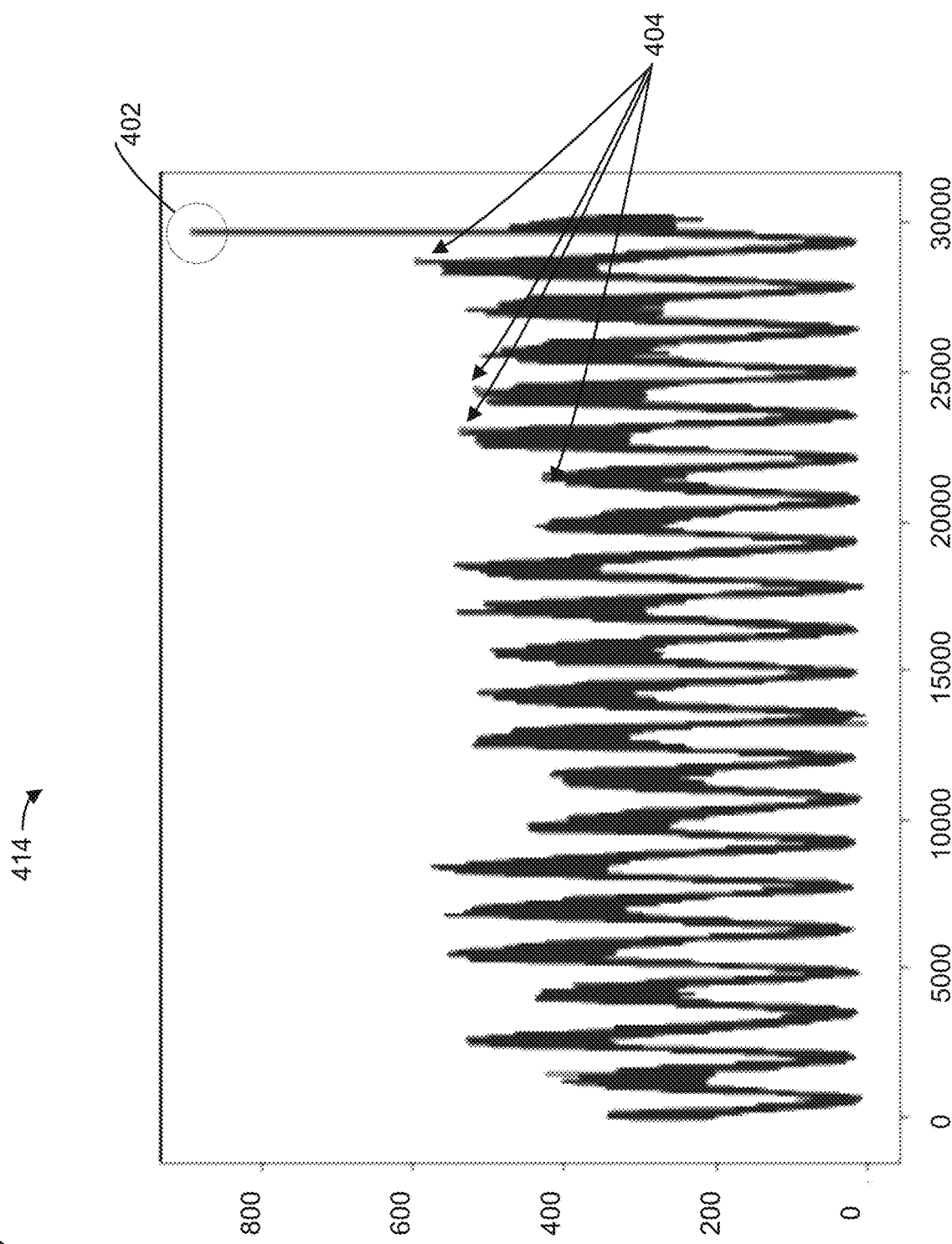
Figure 4D:
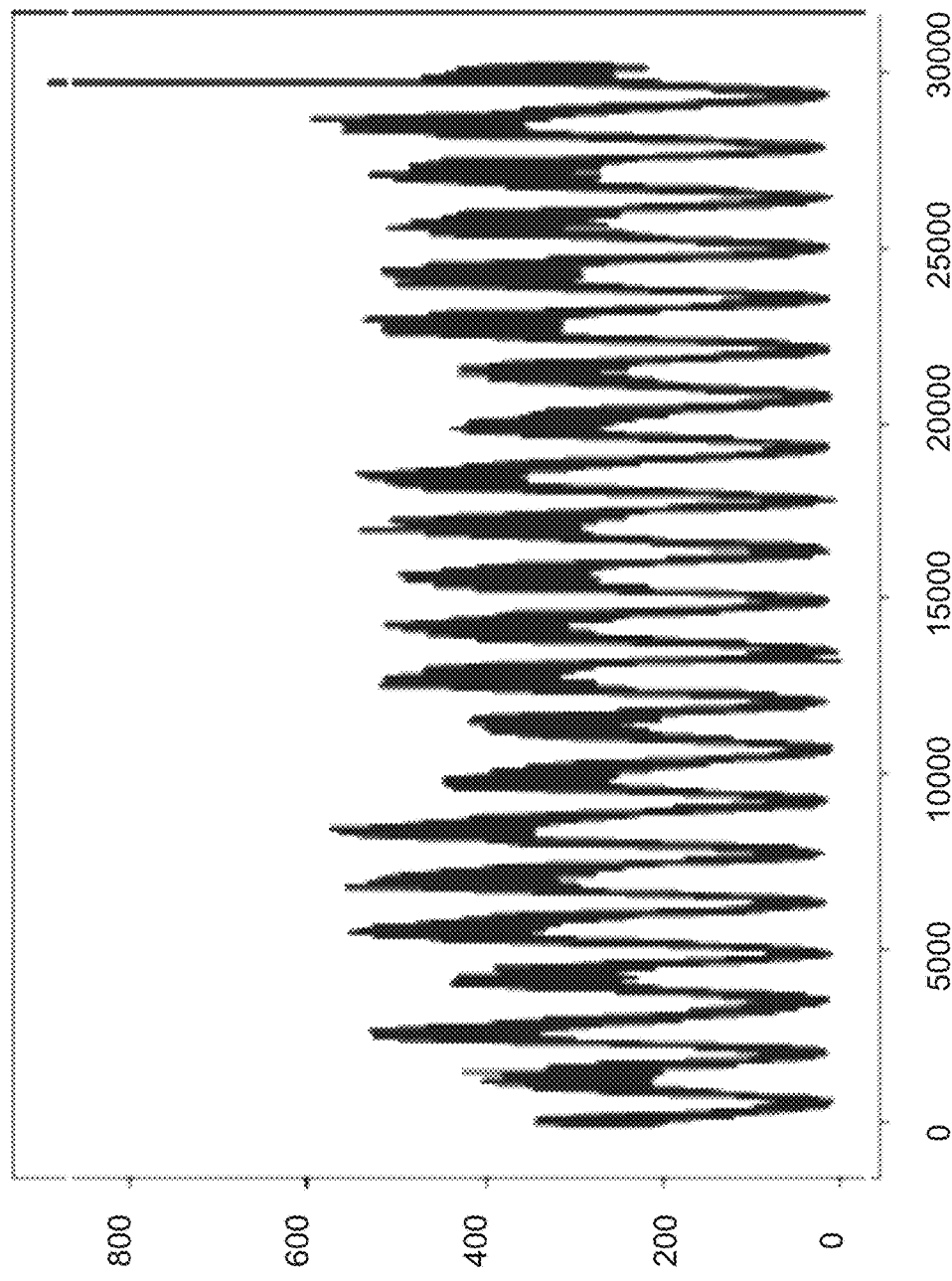
Figure 4E:
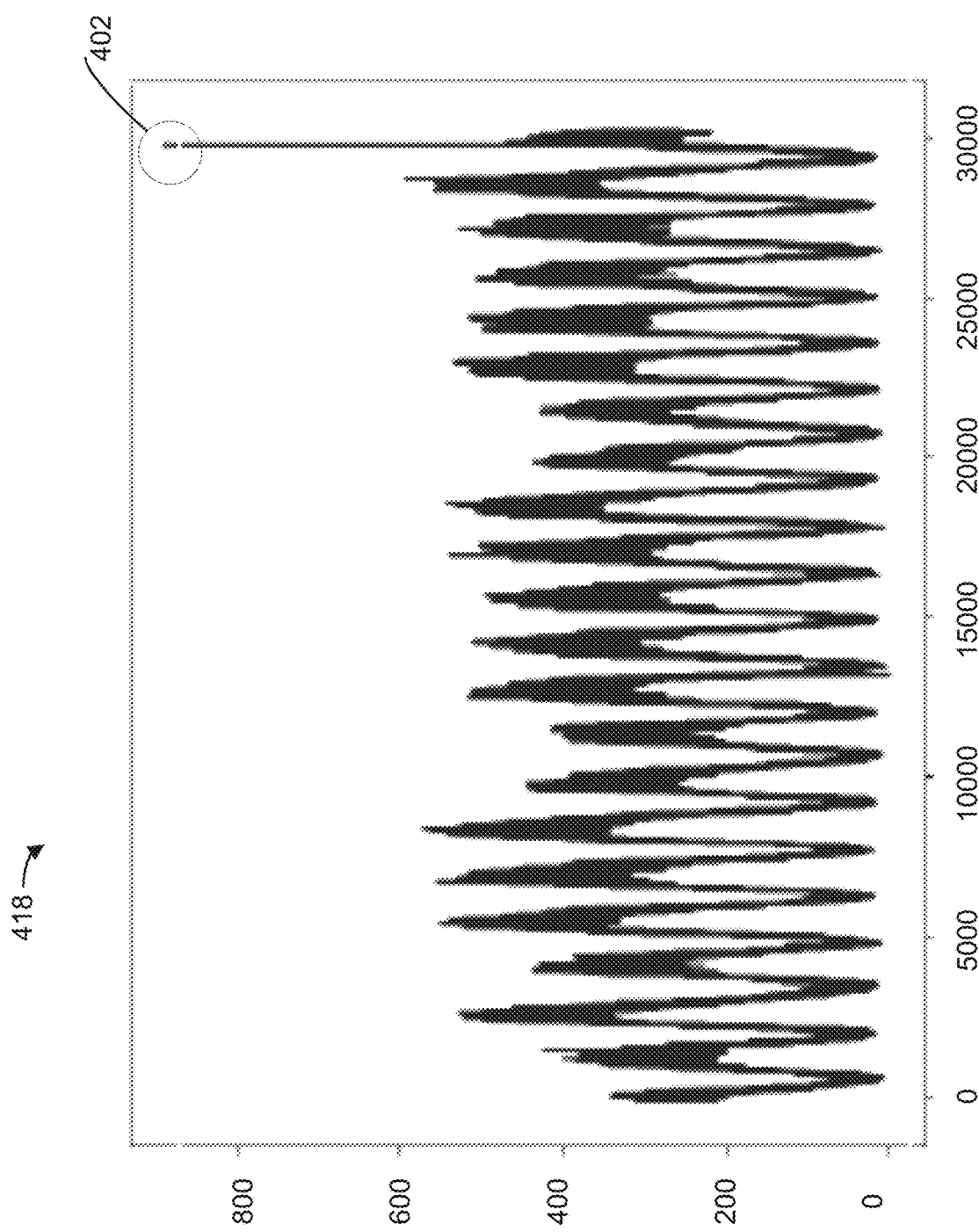

Referring now to FIGS. 4A and 4E, charts further illustrate aspects of embodiments may detect anomalies involving API calls. In these charts, the Y-axis may represent a time dimension (e.g., number of days) and the X-axis may represent a value dimension (e.g., number of transactions). A chart 410 in FIG. 4A may represent using a quantile based detection distribution applied to the transaction data collected by the system 100. In this chart, the actual anomaly is identified in 402, but this detection distribution also produces many false positives 404. Hence, such detection distribution is not preferred or recommended.

In chart 412 in FIG. 4B, it may be a representation of Pareto extreme left tail model (e.g., minimum model). As such, this demonstrate the minimum ends or tails of the distribution. Again, this chart displays many false positives 404. Chart 414 in FIG. 4C may represent the application of the distribution of Pareto extreme right tail model, which produces many false positives 404 on the higher end of the values, while also detecting the anomaly 402. Chart 416 in FIG. 4D may represent the application of the distribution of Gumbel minimum model and it did not detect any false positives on the minimum side. Finally, chart 418 in FIG. 4E may represent the application of the distribution of Gumbel maximum model which, unlike those charts in FIGS. 4A, 4B and 4C, identifies the anomaly 402 without identifying the false positives 404. This may mean the distribution Gumbel maximum model and the goodness fitness test may be best suited.

Figure 5A:
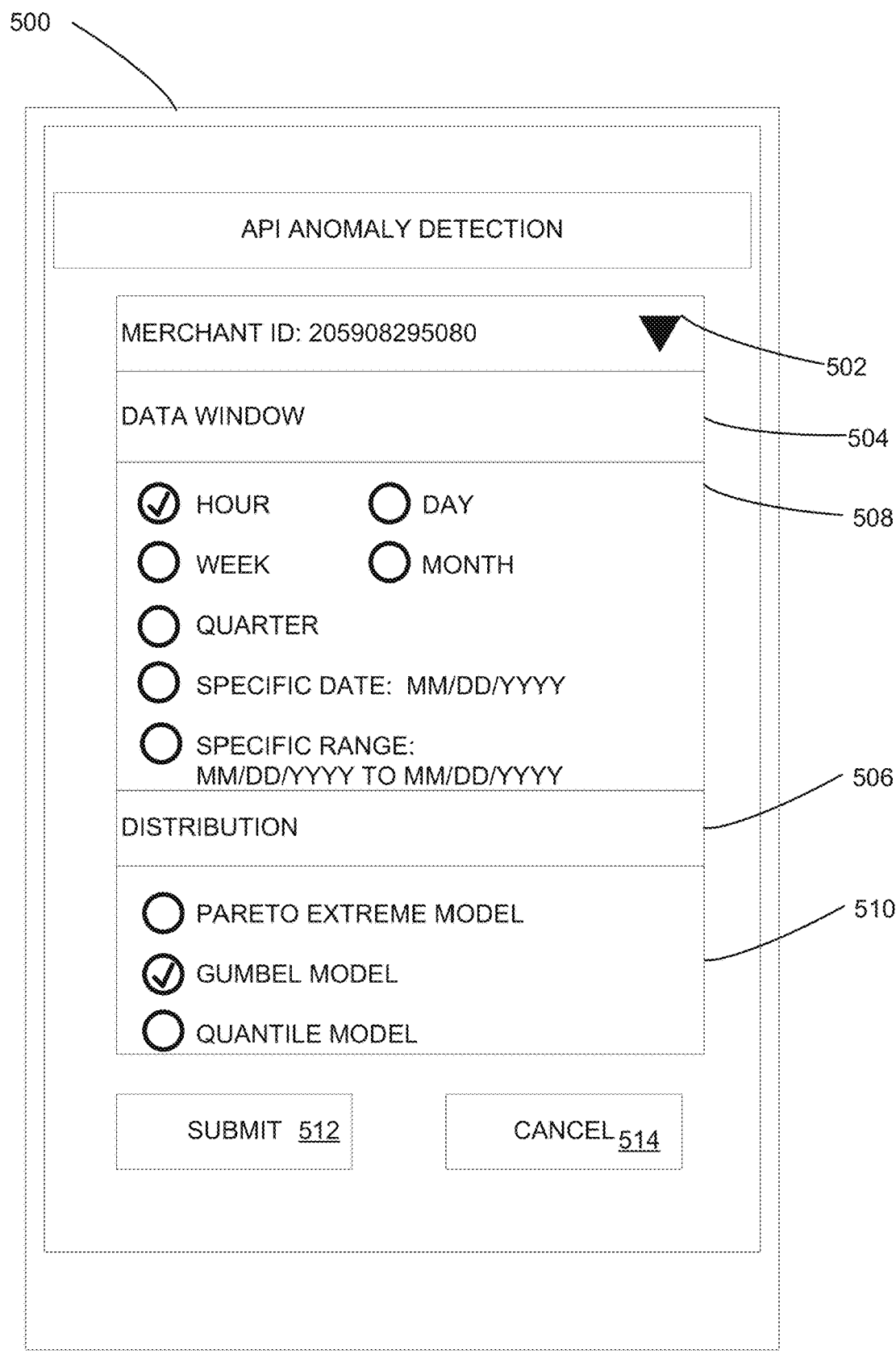
FIG. 5A illustrates a graphical user interface (GUI) for configuring a suitable probability distribution according to one embodiment.

Referring now to FIG. 5A, a GUI 500 may illustrate an exemplary user interface for the user (e.g., merchant 116 or 126) to interact with the server 102 of the system 100 to help the merchant identify API call anomalies. In one embodiment, the GUI 500 may include a header 502 identifying the merchant by the merchant ID. In another embodiment, suppose the merchant has one or more IDs associated therewith, the user may select the down arrow in the header 502 to choose a different merchant ID. Once selected, the user may further configure in either section 504 or 506: in section 504, the user may configure the data window in pane 508, whether by hour, day, week, month, quarter, specific date, or a specific range. Once selected, a checkmark may indicate the selection. In the section 506, the user may further select a desirable distribution model in pane 510, such as Pareto extreme model, a Gumbel model or a quantile based model. Again, once selected, the user may see a checkmark next to the selection. The user may select a submit button 512 once he or she is satisfied with the selection or a cancel button 514 to abort the attempt.

Referring now to FIG. 5B, a configuration GUI 520 for the system administrator of the system 100 to recommend to the merchant regarding API call anomalies. For example, the GUI 520 may indicate to the administrator the merchant ID in question in pane 522 and the administrator may configure the alert notification method in 524 (e.g., whether the notification is to be sent to the email address or a cell phone number of the administrator in pane 526). The GUI 520 may also indicate to the administrator the current distribution model in pane 528 and pane 530. Aspects of embodiments may present a recommendation pane 532 to the administrator based on the data that has been processed and the analysis of the distribution. The system 100 may further preselect a recommended model in pane 534, and in this example, the "GUMBEL MODEL" has been selected. If the administrator agrees with the recommendation, the administrator may select an accept button 536. On the other hand, the administrator may wish to choose a different model, the administrator may select a different model than suggested and select a submit button 538. If the administrator may wish to cancel the recommendation and the notification altogether, the administrator may select a cancel button 540.

It is to be understood that other GUIs may be presented to assist the administrator or the user of the merchant to configure notifications in response to the detected anomalies without departing from the spirit and scope of the embodiments. Moreover, the system 100 may further employ periodic analysis for the merchant to automatically recommend or adopt the more suitable distributions without any direct, overt, or explicit instructions from the merchant.

Referring now to FIG. 6, a flow chart illustrates a method according to one embodiment. At 602, a server (e.g., server 102) may receive one or more application programming interface (API) calls requesting services provided by the central server. The server 102 may identify one or more of the received API calls associated with a merchant at 604. At 606, the server may construct a distribution (e.g., Pareto, Gumbel, etc.) based on the one or more of the API calls received over time. At 608, the server 102 may execute a pre-defined rule to identify a set of the one or more of the received API calls belonging to a maximum percentile in the distribution and a set of the one or more of the received API calls belonging to a minimum percentile in the distribution. At 610, in response to executing at block 608, the server may estimate a set of the anomalous data points with one or more goodness of fit functions against the maximum percentile and the minimum percentile.

At 612, the server 102 may provide a graphical user interface (GUI) to receive a critical value from a user. At 614, in response to the critical value, the server 102 may generate probabilities of the set of the anomalous data points. The server 102 may display a set of the anomalous data points in response to the probabilities being less than the critical value at 616.

Figure 7:
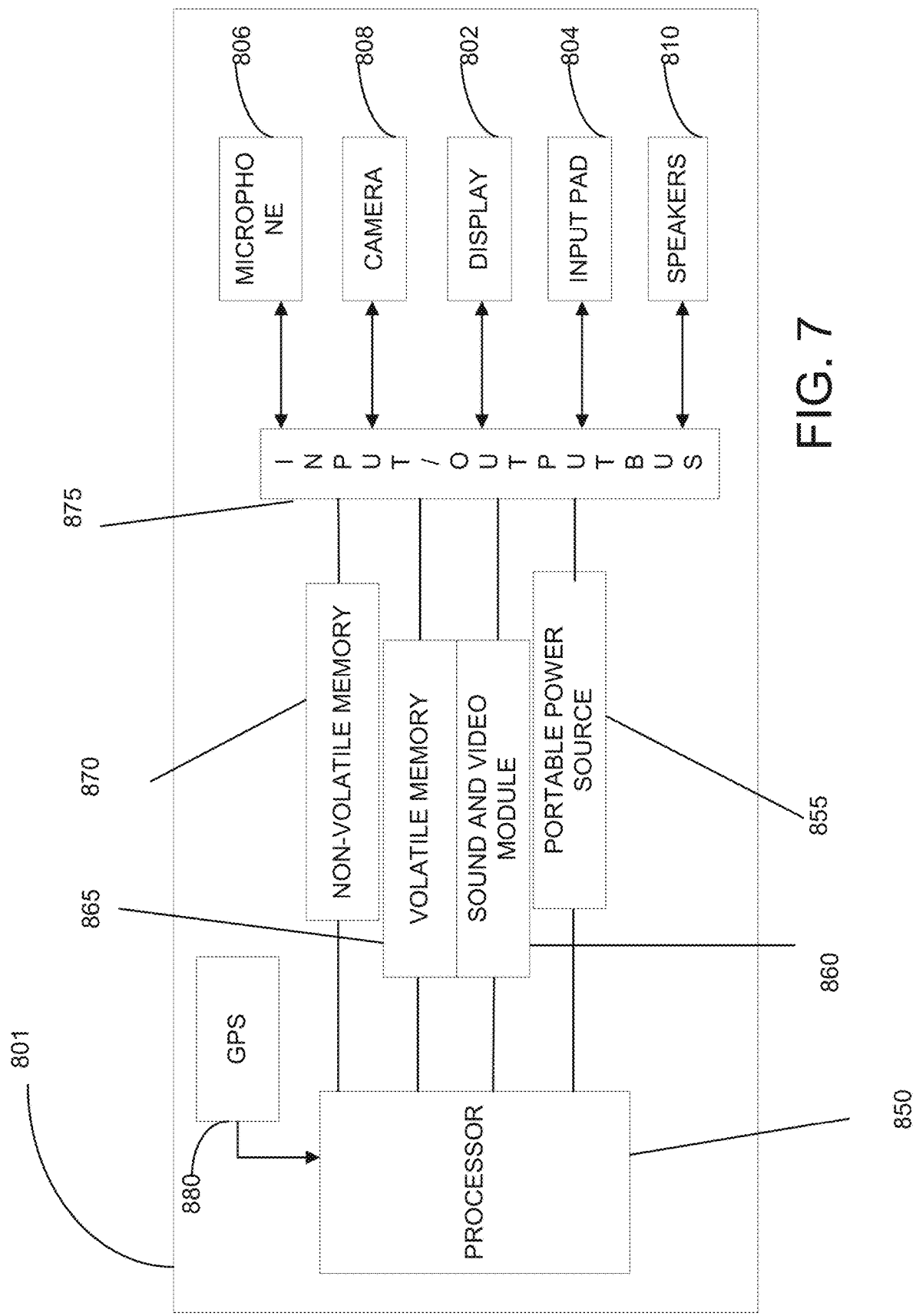
FIG. 7 is a diagram illustrating a portable computing device according to one embodiment.
Figure 8:
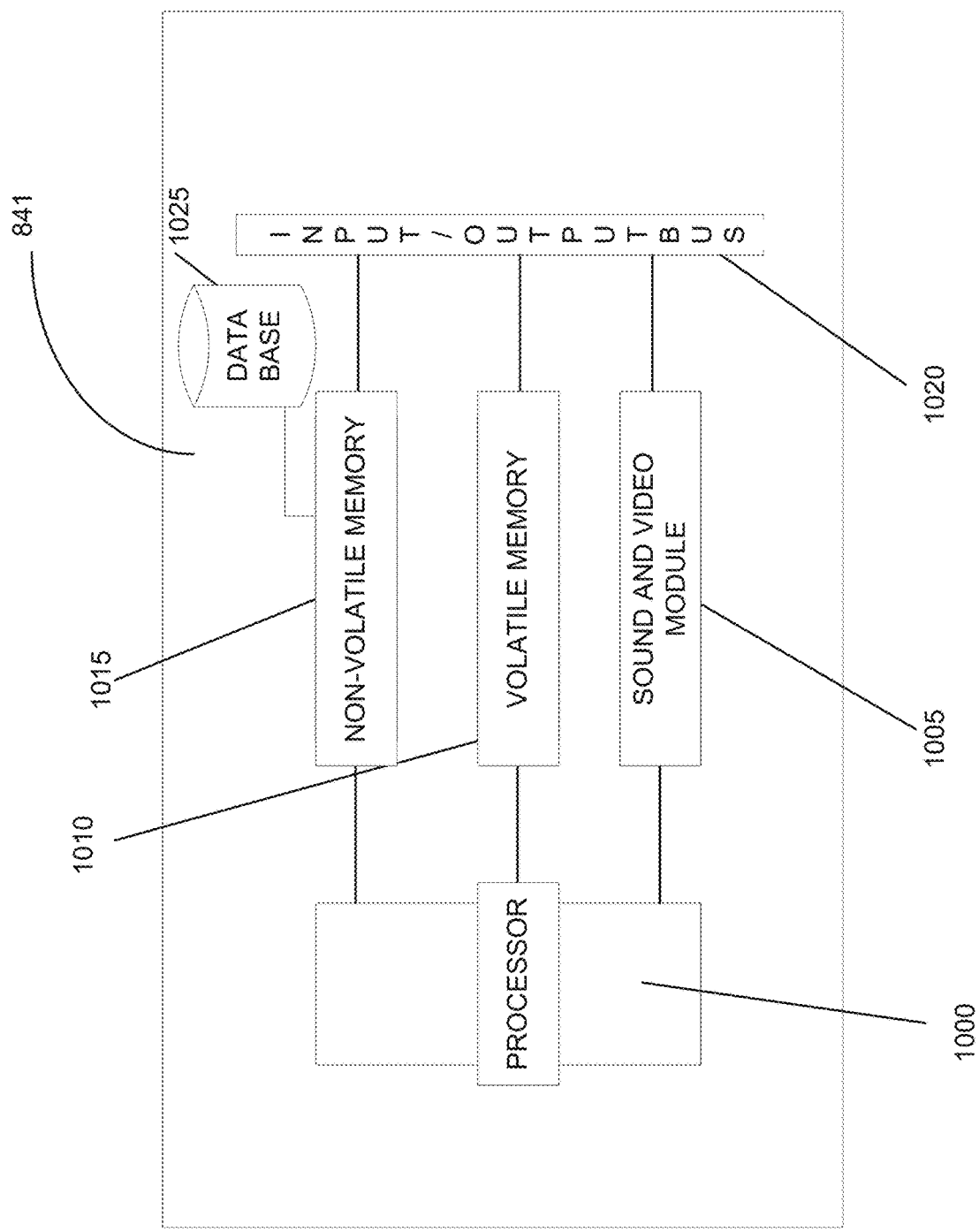
FIG. 8 is a diagram illustrating a computing device according to one embodiment.

FIG. 7 may be a high level illustration of a portable computing device 801 communicating with a remote computing device 841 in FIG. 8 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network 102 such as cellular service, through the Internet, through a private network, through BLUETOOTH, etc., FIG. 7 may be a simplified illustration of the physical elements that make up a portable computing device 801 and FIG. 8 may be a simplified illustration of the physical elements that make up a server type computing device 841.

FIG. 7 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 865 and volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc., It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 8. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc., The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges with traditional approaches to detecting or identifying anomalies in API calls or requests and how to reduce the amount of false positives so that administers or users will not be alerted unncessarily.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
   receiving, at a central server, one or more application programming interface (API) calls requesting services provided by the central server;
   identifying, by the central server, one or more of the received API calls associated with a merchant, the one or more of the received API calls comprise transactions with the merchant;
   constructing, by the central server, a distribution based on the one or more of the API calls received over time;
   executing, by the central server, a pre-defined rule to identify a set of the one or more of the received API calls belonging to a maximum percentile in the distribution and a set of the one or more of the received API calls belonging to a minimum percentile in the distribution;
   in response to executing, estimating, by the central server, a set of anomalous data points associated with the one or more of the API calls while the one or more of the API calls continuing to be processed, wherein the anomalous data points being based on one or more goodness of fit functions against the maximum percentile and the minimum percentile;
   providing, by the central server, a graphical user interface (GUI) to receive a critical value from a user, said critical value defining a tolerance level of anomalies associated with the API calls;
   providing, by the central server, the GUI to receive from the user a selectable notification schedule and a selectable distribution model;
   in response to the critical value, the selectable notification schedule, and the selectable distribution model, generating, by the central server, a recommendation of a distribution model as a function of the set of the anomalous data points, wherein the recommendation differs from the selectable distribution model; and
   displaying, by the central server, a set of the anomalous data points as a function of the recommendation.

2. The computer-implemented method of claim 1, wherein the pre-defined rule comprises a generalized Pareto distribution function or a Gumbel distribution function.

3. The computer-implemented method of claim 1, wherein the minimum percentile is 10 percentile.

4. The computer-implemented method of claim 1, wherein the maximum percentile is 90 percentile.

5. The computer-implemented method of claim 1, wherein the critical value comprise one parameter of the API calls.

6. The computer-implemented method of claim 1, wherein receiving comprises retrieving historical data of the API calls from a database.

7. The computer-implemented method of claim 1, wherein the one or more goodness of fit functions comprise at least KS test function and Anderson Darling Test.

8. The non-transitory tangible computer-readable medium of claim 1, wherein the one or more goodness of fit functions comprise at least KS test function and Anderson Darling Test.

9. The system of claim 1, wherein the one or more goodness of fit functions comprise at least KS test function and Anderson Darling Test.

10. A non-transitory tangible computer-readable medium having computer-executable instructions stored thereon, the computer-executable instructions comprising:
    identifying, by the server, one or more application programming interface (API) calls associated with a merchant, the one or more of the received API calls comprise transactions with the merchant;
    evaluating, by the server, a statistical distribution based on the one or more of the API calls received over time;
    executing, by the server, a set of rules to identify a set of the one or more calls belonging to a first percentile in the statistical distribution and a set of the one or more API calls belonging to a second percentile in the statistical distribution;
    in response to executing, estimating, by the server, a set of anomalous data points associated with the one or more of the API calls while the one or more of the API calls continuing to be processed, wherein the anomalous data points being based on one or more goodness of fit functions against the first percentile and the second percentile;
    providing, by the server, a graphical user interface (GUI) to receive a critical value from a user, said critical value defining a tolerance level of anomalies associated with the API calls;
    providing, by the server, the GUI to receive from the user a selectable notification schedule and a selectable distribution model;
    in response to the critical value, the selectable notification schedule, and the selectable distribution model, generating, by the server, a recommendation of a distribution model as a function of the set of the anomalous data points, wherein the recommendation differs from the selectable distribution model; and
    displaying, by the server, a set of the anomalous data points as a function of the recommendation.

11. The non-transitory tangible computer-readable medium of claim 10, wherein the set of rules comprises a generalized Pareto distribution function or a Gumbel distribution function.

12. The non-transitory tangible computer-readable medium of claim 10, wherein the minimum percentile is 10 percentile.

13. The non-transitory tangible computer-readable medium of claim 10, wherein the maximum percentile is 90 percentile.

14. The non-transitory tangible computer-readable medium of claim 10, wherein the critical value comprise one parameter of the API calls.

15. A system comprising:
    a database for storing data associated with transactional application programming interface (API) calls, the one or more of the received API calls comprise transactions with the merchant;
    a payment processing network server configured to execute computer-executable instructions stored in the database for:

identifying one or more API calls associated with a merchant;

identifying a pattern in the one or more API calls;

executing a set of rules to identify a set of the one or more API calls belonging to a first percentile in the pattern and a set of the one or more API calls belonging to a second percentile in the pattern;

in response to executing, estimating a set of the anomalous data points associated with the one or more of the API calls while the one or more of the API calls continuing to be processed, wherein the anomalous data points being based on one or more goodness of fit functions against the first percentile and the second percentile;

providing a graphical user interface (GUI) to receive a critical value from a user, said critical value defining a tolerance level of anomalies associated with the API calls;

providing, by the central server, the GUI to receive from the user a selectable notification schedule and a selectable distribution model;

in response to the critical value, the selectable notification schedule, and the selectable distribution model, generating a recommendation of a distribution model as a function of the set of the anomalous data points, wherein the recommendation differs from the selectable distribution model; and displaying a set of the anomalous data points as a function of the recommendation.

16. The system of claim 15, wherein the pre-defined rule comprises a generalized Pareto distribution function or a Gumbel distribution function.

17. The system of claim 15, wherein the second percentile is 10 percentile.

18. The system of claim 15, wherein the first percentile is 90 percentile.

19. The system of claim 15, wherein the critical value comprise one parameter of the API calls.

20. The system of claim 15, wherein the payment network processing server is configured to retrieve historical data of the API calls from the database.

* * * * *